US012559033B2

(12) United States Patent (10) Patent No.: US 12,559,033 B2
Tsuda et al. (45) Date of Patent: Feb. 24, 2026

(54) VEHICLE REARWARD MONITORING SYSTEM AND VEHICLE REARWARD MONITORING METHOD

(71) Applicant: Isuzu Motors Limited, Yokohama (JP)

(72) Inventors: Ryuta Tsuda, Fujisawa (JP); Yasuhiro Ono, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 341 days.

(21) Appl. No.: 18/124,625

(22) Filed: Mar. 22, 2023

(65) Prior Publication Data

US 2023/0302999 A1 Sep. 28, 2023

(30) Foreign Application Priority Data

Mar. 23, 2022 (JP) ................................. 2022-046661

(51) Int. Cl.
| | |
|---|---|
| *G06T 7/73* | (2017.01) |
| *B60R 1/26* | (2022.01) |
| *G06T 7/246* | (2017.01) |
| *G06T 7/60* | (2017.01) |
| *G08G 1/16* | (2006.01) |

(Continued)

(52) U.S. Cl.
CPC ............... *B60R 1/26* (2022.01); *G06T 7/246* (2017.01); *G06T 7/60* (2013.01); *G06T 7/73* (2017.01); *G08G 1/16* (2013.01); *H04N 23/54* (2023.01); *H04N 23/90* (2023.01); *B60R 2300/308* (2013.01); *B60R 2300/8093* (2013.01);

(Continued)

(58) Field of Classification Search
CPC ............... B60R 1/26; B60R 2300/308; B60R 2300/8093; B60R 2300/8066; G06T 7/246; G06T 7/60; G06T 7/73; G06T 2207/10132; G06T 2207/30252; G08G 1/16; G08G 1/165; H04N 23/54; H04N 23/90; H04N 5/2628; H04N 5/268; H04N 7/181; B60W 30/0956; B60W 2300/12; B60W 2552/50
USPC ........................................................ 382/103
See application file for complete search history.

(56) References Cited

U.S. PATENT DOCUMENTS

| | | | | |
|---|---|---|---|---|
| 2005/0159893 A1* | 7/2005 | Isaji | ........................... | G06T 7/20 |
| | | | | 340/436 |
| 2008/0088717 A1* | 4/2008 | Isomura | ............... | H04N 23/675 |
| | | | | 348/E5.045 |

(Continued)

FOREIGN PATENT DOCUMENTS

| | | |
|---|---|---|
| JP | 2022-006844 | 1/2022 |
| JP | 2022-016027 | 1/2022 |
| JP | 2022-023870 | 8/2022 |

*Primary Examiner* — Stephen P Coleman

(57) ABSTRACT

A vehicle rearward monitoring system configured to monitor an object located behind and above a truck, the vehicle rearward monitoring system including: an object detection unit installed in the truck and configured to detect the object located behind and above an upper end of a rear end of the truck; an object specifying unit configured to specify a position, a size and a velocity vector with respect to the truck of the object detected by the object detection unit; and a collision possibility determination unit configured to determine a possibility of collision of the truck with the object detected by the object detection unit from the position, the size and the velocity vector of the object specified by the object specifying unit, and make a driver of the truck recognize the possibility of collision when it is determined that there is the possibility of collision.

10 Claims, 9 Drawing Sheets

(51) Int. Cl.
    *H04N 23/54*          (2023.01)
    *H04N 23/90*          (2023.01)

(52) U.S. Cl.
    CPC ............... *G06T 2207/10132* (2013.01); *G06T 2207/30252* (2013.01)

(56)                    References Cited

U.S. PATENT DOCUMENTS

| | | | |
|---|---|---|---|
| 2011/0115615 A1* | 5/2011 | Luo ........................... | B60R 1/30 |
| | | | 348/148 |
| 2014/0091937 A1* | 4/2014 | Pratt ....................... | G06T 7/246 |
| | | | 340/670 |
| 2022/0195783 A1* | 6/2022 | Park ........................ | E05F 15/70 |

* cited by examiner

VEHICLE REARWARD MONITORING SYSTEM AND VEHICLE REARWARD MONITORING METHOD

CROSS REFERENCE TO RELATED APPLICATIONS

This application claims the benefit of priority of Japanese Patent Application No. 2022-046661, filed on Mar. 23, 2022, the contents of which are incorporated by reference as if fully set forth herein in their entirety.

TECHNICAL FIELD

The present disclosure relates to a vehicle rearward monitoring system and a vehicle rearward monitoring method.

BACKGROUND ART

A system for vehicles that captures the periphery of a vehicle for the purpose of preventing collision and displays it on the monitor at the driver's seat by converting the captured image into a perspective image as viewed from the upper side of the vehicle so that the driver can recognize the hindrance around the vehicle is known (PTL 1). In addition, a technique of capturing the periphery of the vehicle with a camera with a wider field angle than typical cameras such as wide-angle cameras is also known (PTL 2).

CITATION LIST

Patent Literature

PTL 1
Japanese Patent Application Laid-Open No. 2022-23870
PTL 2
Japanese Patent Application Laid-Open No. 2022-6844

SUMMARY OF INVENTION

Technical Problem

The hindrance around the vehicle includes not only hindrance on the road, but also structures located above the vehicle such as the roof and eaves of the garage. In addition, in the case where the building has a two-story structure, the structures inside the building such as the ceiling of the first floor and the floor of the second floor are provided above the vehicle.

However, in the technique of displaying the perspective image disclosed in PTL 1, the height of the structures above the vehicle are unknown even when they are shown in the perspective image, the driver cannot determine whether the vehicle can travel under the structure without colliding it especially when the vehicle moves backward. In addition, also in the image captured with the wide-angle camera disclosed in PTL 2, the height of the structure above the vehicle is unknown even when it is captured in the image, and consequently the driver cannot determine whether there is a possibility of collision especially when the vehicle moves backward.

To solve the above-described problems, an object of the present disclosure is to provide a vehicle rearward monitoring system with which the driver can determine the possibility of collision of the vehicle with a structure behind and above the vehicle.

Solution to Problem

To achieve the above-mentioned object, a vehicle rearward monitoring system according to one aspect of the present disclosure is configured to monitor an object located behind and above a vehicle, the vehicle rearward monitoring system including: an object detection unit installed in the vehicle and configured to detect the object located behind and above an upper end of a rear end of the vehicle; an object specifying unit configured to specify a position, a size and a velocity vector with respect to the vehicle of the object detected by the object detection unit; and a collision possibility determination unit configured to determine a possibility of collision of the vehicle with the object detected by the object detection unit from the position, the size and the velocity vector of the object specified by the object specifying unit, and make a driver of the vehicle recognize the possibility of collision when it is determined that there is the possibility of collision.

A vehicle rearward monitoring method according to another aspect of the present disclosure is configured to monitor an object located behind and above a vehicle, the vehicle rearward monitoring method including: detecting the object located behind and above an upper end of a rear end of the vehicle; specifying a position, a size and a velocity vector with respect to the vehicle of the object detected by the detecting; and determining a possibility of collision of the vehicle with the object detected by the detecting from the position, the size and the velocity vector of the object specified by the specifying, and making a driver of the vehicle recognize the possibility of collision when it is determined that there is the possibility of collision.

Advantageous Effects of Invention

According to the present disclosure, it is possible to provide a vehicle rearward monitoring system with which the driver can determine the possibility of collision of the vehicle with a structure behind and above the vehicle.

BRIEF DESCRIPTION OF DRAWINGS

FIG. 4A is a side view of FIG. 3 in which a warehouse is illustrated in a sectional view, and FIG. 4B is a plan view of FIG. 3A;

FIG. 8A illustrates an upper camera image captured with an upper camera, and FIG. 8B illustrates a lower camera image captured with a lower camera.

DESCRIPTION OF EMBODIMENTS

Preferred embodiments of the present disclosure are elaborated below with reference to the accompanying drawings. Here, as rearward monitoring system 1, the following describes an example of a system for detecting an object behind and above cargo bed 107 of truck 100, which is a vehicle provided with cargo bed 107 of a van-body type. In addition, in the following drawings, the X direction is the front-rear direction of truck 100, the Y direction is the vehicle width direction of truck 100, and the Z direction is the vertical direction.

Figure 1:
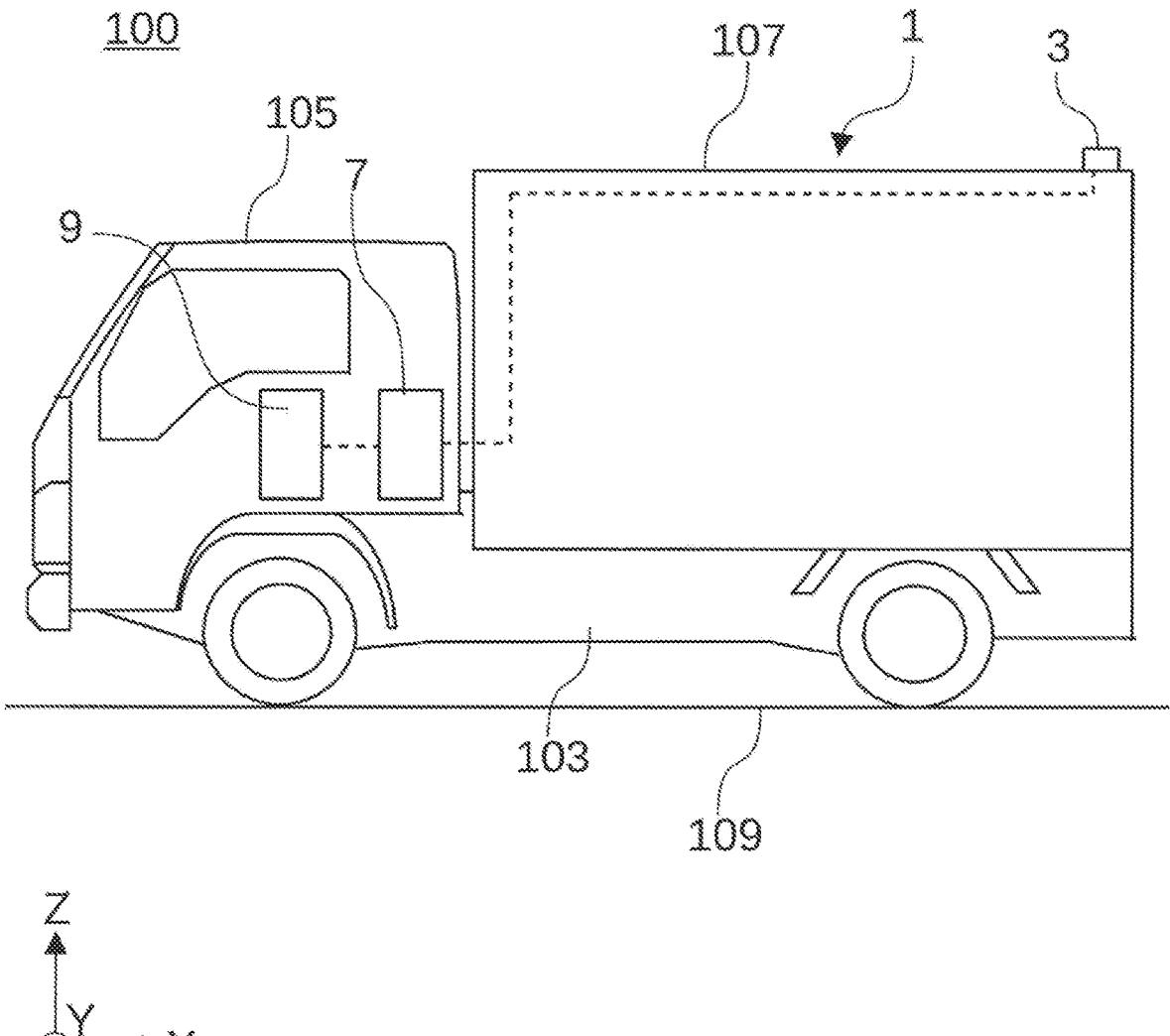
FIG. 1 is a side view of a truck including a rearward monitoring system according to a first embodiment of the present disclosure.

First, with reference to FIG. 1, an overview of the structure of truck 100 according to a first embodiment is described. Truck 100 illustrated in FIG. 1 includes chassis 103, which is a structure for supporting the apparatuses making up truck 100, cab 105, which is a cab provided at the front end of chassis 103, cargo bed 107 provided at chassis 103 on the rear side of cab 105, and rearward monitoring system 1.

Figure 2:
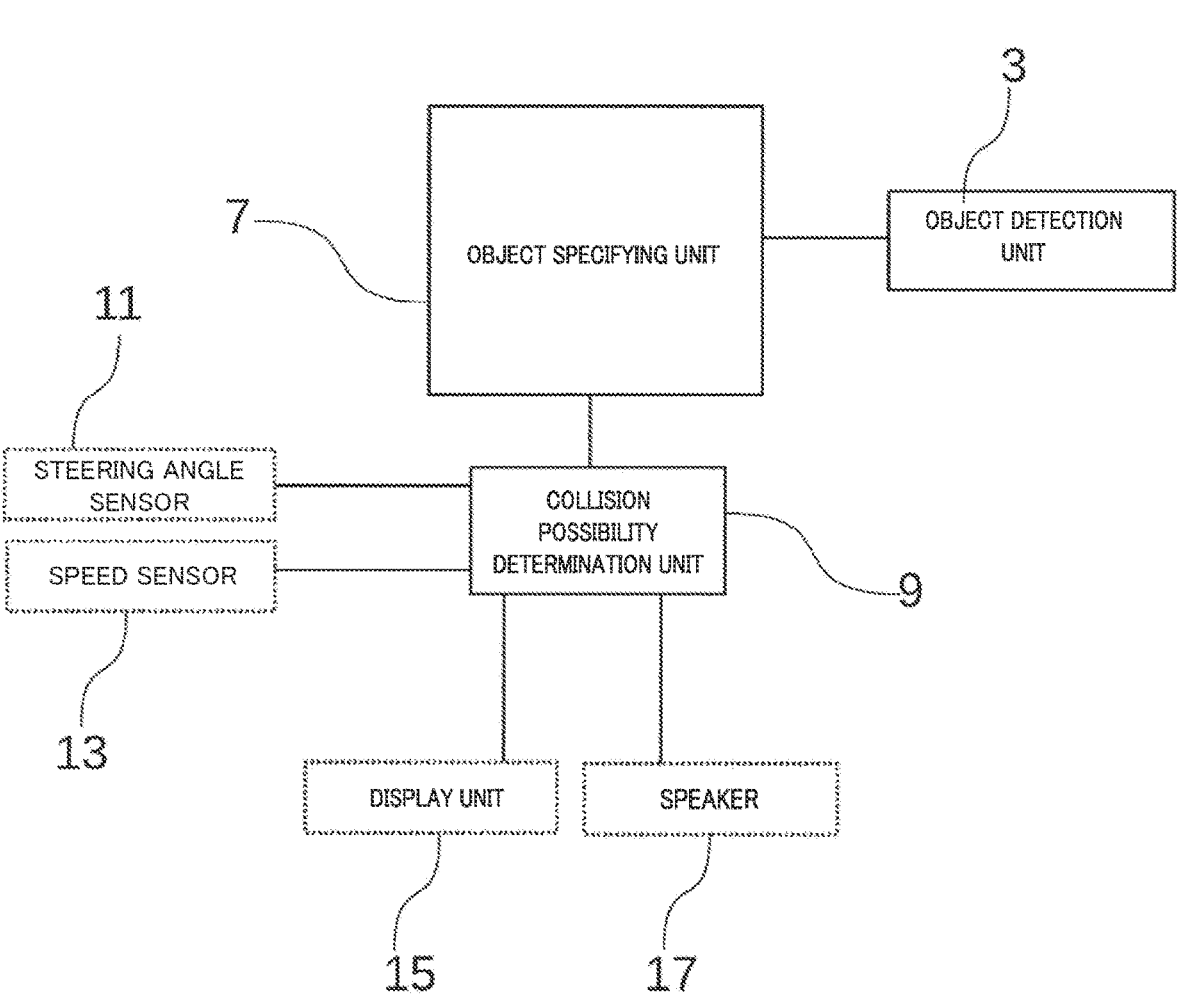
FIG. 2 is a functional block diagram of the rearward monitoring system according to the first embodiment.

Next, a structure of rearward monitoring system 1 according to the first embodiment is described in detail below with reference to FIGS. 1 to 5. As illustrated in FIGS. 1 and 2, rearward monitoring system 1 includes object detection unit 3, object specifying unit 7, and collision possibility determination unit 9.

Object detection unit 3 is an apparatus for detecting objects behind and above truck 100, i.e., objects behind and above cargo bed 107 in this case, and is installed in cargo bed 107 of truck 100. The phrase "detect objects" as used herein means acquiring information required for specifying the position and size of the object and the velocity vector of the object with respect to truck 100. For example, an image-capturing device such as a monocular camera can specify the position, size and velocity vector of the object from the captured image through publicly known image analyses such as edge extraction. As such, a monocular camera can acquire an image as information required for specifying the object, and is therefore included in object detection unit 3. In addition, an apparatus such as a clearance sonar that emits ultrasound to the surroundings and detects returning ultrasound reflected by the object is also included in object detection unit 3 because such an apparatus can specify the position, size and velocity vector of the object from the time required for the returning and the returning direction of the ultrasound.

Unlike clearance sonars, a monocular camera does not emit waves such as ultrasound, which is advantageous because it does not cause erroneous detection of objects due to waves hitting cargo bed 107. Further, in the case where truck 100 is provided with a known rearward monitoring camera such as a wide-angle camera, the camera can be used also as object detection unit 3, which is also advantageous. On the other hand, a clearance sonar can directly detect the position of the object from the detected ultrasound, which is advantageous because the accuracy of the object detection is higher than that of the combination of the monocular camera and the image analysis. In the following description, unless otherwise noted, a case where a wide-angle camera, which is a monocular camera, is used as object detection unit 3 is described as an example.

Figure 3:
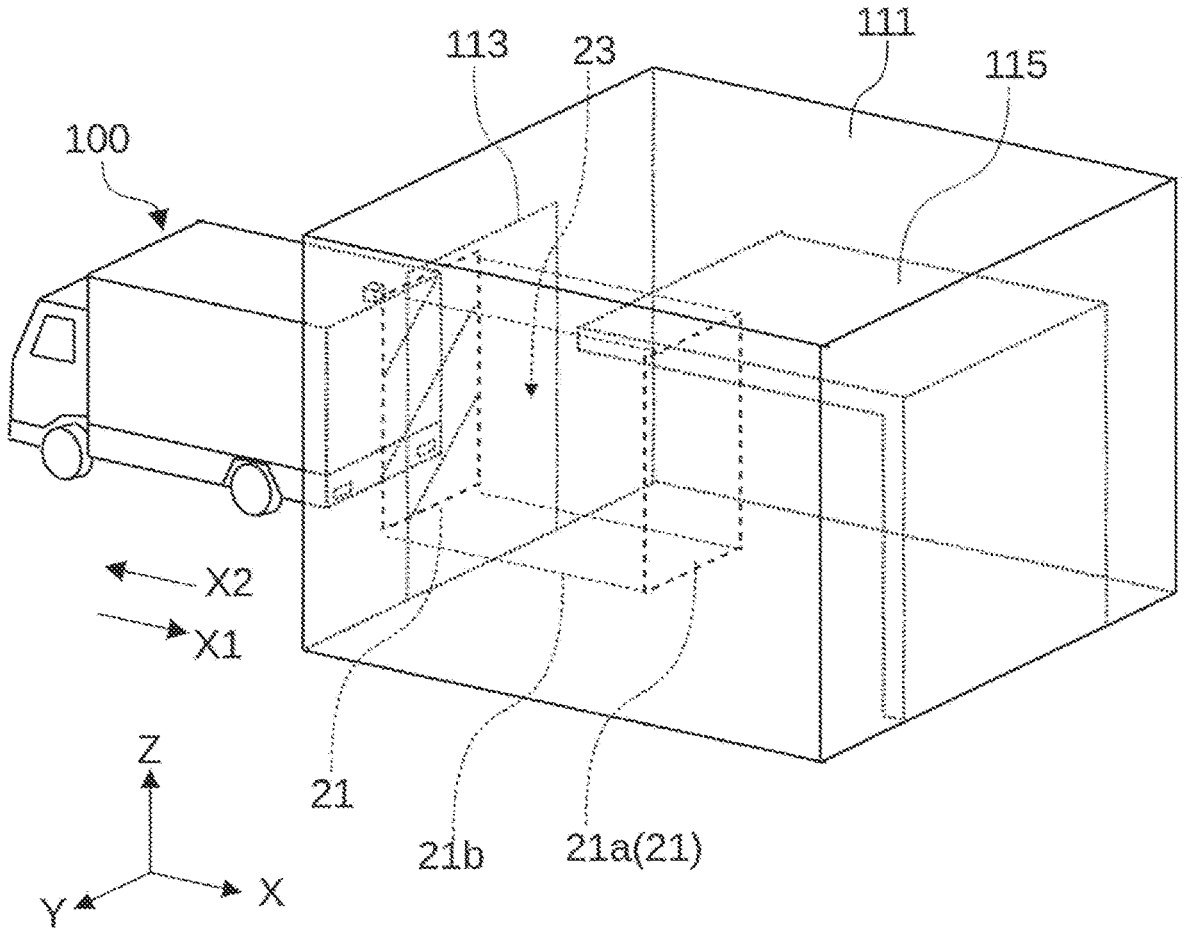
FIG. 3 is a perspective view for describing a procedure of detecting an object located behind and above a truck with the rearward monitoring system according to the first embodiment.
Figure 4A:
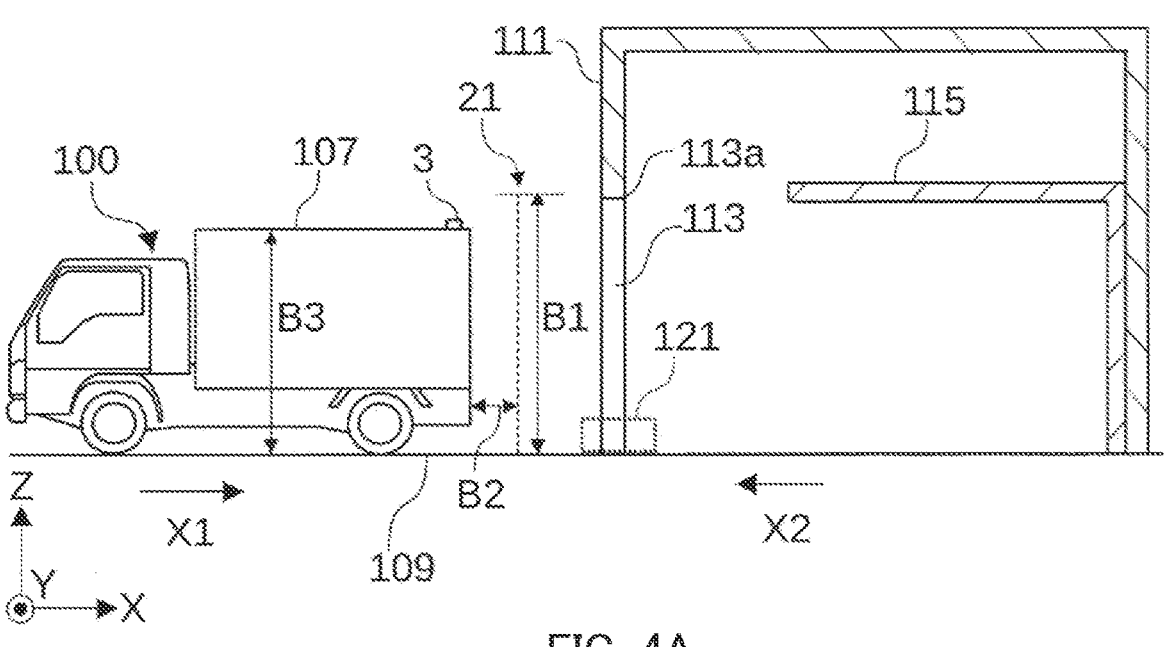
FIGS. 4A and 4B are diagrams for describing a procedure of detecting with the rearward monitoring system according to the first embodiment an object located behind and above a truck.

For example, as illustrated in FIGS. 3 and 4A, it is assumed that truck 100 is about to move back in the X1 direction into warehouse 111 from entrance 113. In addition, it is assumed that warehouse 111 has a two-story structure, and second-floor floor 115, which is the ceiling of the first-floor part and the floor of the second-floor part, are provided at the back surface of warehouse 111 in such a manner as to protrude in the X2 direction from the position higher than the upper end of truck 100.

Figure 5:
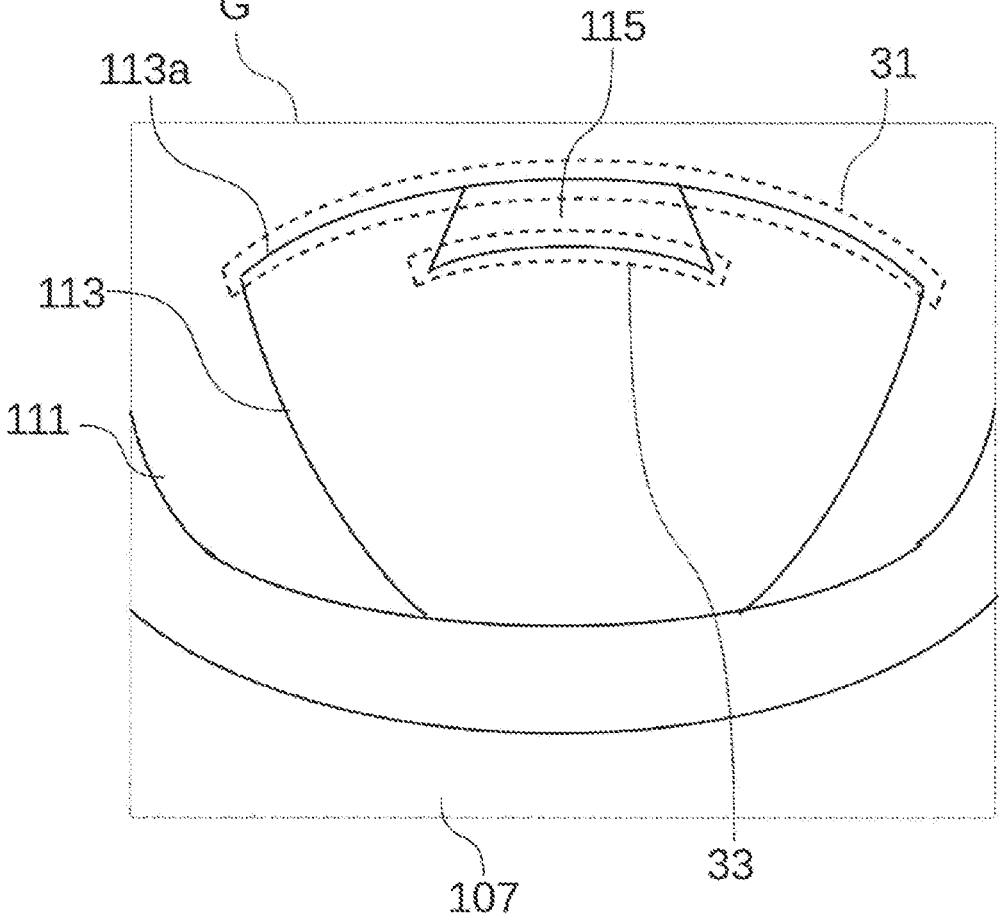
FIG. 5 is a schematic view of an image of a warehouse captured with a wide-angle camera serving as an object detection unit in the state illustrated in FIGS. 3 and 4.

In this case, object detection unit 3, which is a wide-angle camera, captures an image including a portion behind and above the upper end of the rear end of cargo bed 107 of truck 100. More specifically, it captures an image that shows the rear end of cargo bed 107, upper frame 113a of entrance 113 of warehouse 111, and the second-floor floor 115 in warehouse 111. The field angle and optical axis of the wide-angle camera may be appropriately set in the range where an image of a portion behind and above the rear end of cargo bed 107 of truck 100 can be captured. FIG. 5 illustrates an example of captured image G. Image G illustrated in FIG. 5 shows warehouse 111, entrance 113 of warehouse 111, upper frame 113a of entrance 113, and the second-floor floor 115 in warehouse 111. Note that image G is an image captured by the wide-angle camera, and therefore a portion that is originally a straight line is shown in a circular distorted shape.

In addition, object detection unit 3 acquires information required for specifying the object at a predetermined time interval. In the case where object detection unit 3 is a wide-angle camera, object detection unit 3 repeatedly captures images at a predetermined time interval. The reason for this is to acquire the velocity vector of the object with respect to truck 100 from the variation of the position and size of the detected object on the image. In addition, the installation position of object detection unit 3 may be selected as necessary as long as objects behind and above cargo bed 107 can be detected. FIG. 1 illustrates an example in which it is installed at the upper end of the rear end of cargo bed 107. Regarding the installation position of object detection unit 3 in the vehicle width direction, it is preferably be located at the center in the vehicle width direction because the left and right regions where objects can be detected are approximately equal to each other in the vehicle width direction.

Object specifying unit 7 illustrated in FIG. 2 is an apparatus for specifying the position, size and velocity vector with respect to truck 100 of the object detected by object detection unit 3, and is provided in cab 105, for example. More specifically, object specifying unit 7 acquires information required for specifying the object from object detection unit 3, and specifies the position and size of the object and the velocity vector of the object with respect to truck 100 from the acquired information.

In the case where object detection unit 3 is a wide-angle camera, object specifying unit 7 acquires image G captured by the wide-angle camera from object detection unit 3 as information required for specifying the object. In the case where object detection unit 3 is a clearance sonar, object specifying unit 7 acquires the time taken for returning the emitted ultrasound, the returning direction and the like from object detection unit 3 as information required for specifying the object.

In the case where object detection unit 3 is a wide-angle camera, object specifying unit 7 specifies the position and size of the object and the velocity vector of the object with respect to truck 100 through image analysis from image G captured by the wide-angle camera. More specifically, it is preferable to specify the position of the object through extraction of the corners of the object in image G by using the variation in brightness in the image and the like, i.e., so-called edge extraction, because the position of the object can be easily specified. The size of the object, or in this case, the width in the Y direction and the height in the Z direction, may be calculated from the range occupied by the image of the extracted object. The velocity vector of the object as used herein means the travelling direction and relative travelling speed of the object with respect to truck 100. In the example illustrated in FIG. 5, the speed of warehouse 111 is normally 0 because warehouse 111 itself does not move. It should be noted that in image G captured by the wide-angle camera, the position and size of second-floor floor 115 and upper frame 113a in image G vary when truck 100 moves. For example, when truck 100 travels in the X1 direction as illustrated in FIGS. 3 and 4A, truck 100 approaches upper frame 113a and second-floor floor 115, and therefore the sizes of the captured upper frame 113a and second-floor floor 115 gradually increase when image G is repeatedly captured at a predetermined time interval. That is, on image G, upper frame 113a and second-floor floor 115 appear to move relative to truck 100 at a predetermined speed in the X2 direction. Therefore, object specifying unit 7 specifies, as a velocity vector, the relative travelling speed and the travelling direction from the variation of the position of the extracted object in a plurality of images G captured at a predetermined time interval by object detection unit 3, and the variation of the occupied range in image G.

In the case where object detection unit 3 is a clearance sonar, object specifying unit 7 may specify the position, size and velocity vector of the object from the time taken for returning the emitted ultrasound, i.e., the time from emission to detection of the ultrasound, and the returning direction of the ultrasound.

Collision possibility determination unit 9 illustrated in FIG. 2 is an apparatus for determining the possibility of collision of truck 100 with the object detected by object detection unit 3 from the position, size and velocity vector of the object specified by object specifying unit 7, and is provided in cab 105, for example. In the case where collision possibility determination unit 9 is also an apparatus that makes the driver of truck 100 recognize the possibility of the collision when it is determined that there is a possibility of collision of truck 100 with the object detected by object detection unit 3. Note that the possibility of collision means a state where there is an object within a range of the traveling path that is anticipated from the current travelling direction of truck 100, not a state where the collision cannot be avoided unless the driver immediately brakes. Examples of the criterion for determining the possibility of collision of truck 100 with the object are as follows.

First, collision possibility determination unit 9 determines whether the size of the object specified by object specifying unit 7 is not smaller than a predetermined size. When the size is smaller than the predetermined size, collision possibility determination unit 9 does not determine the possibility of collision. The reason for this is that it is not necessary to determine the possibility of collision for the matters such as trash or dust floating in the air that cause no problem even if they hit truck 100. The size not smaller than a predetermined size is a size which may possibly damage truck 100 when collided with truck 100, for example.

Next, collision possibility determination unit 9 determines whether the object specified by object specifying unit 7 will collide with truck 100. More specifically, it determines whether the object specified by object specifying unit 7 falls within region 23 surrounded by guide line 21 when guide line 21 indicating the outer periphery in back view of the rear end of cargo bed 107 of truck 100 illustrated in FIGS. 3 and 4A is extended rearward of truck 100. As a result, when it is determined that it does not fall within region 23, it is determined that there is no possibility of collision. The reason for this is that since region 23 surrounded by guide line 21 is located inside the traveling path of the travelling vehicle, there is no possibility of collision when the object does not fall inside region 23. Note that region 23 surrounded by guide line 21 is set as follows. First, as illustrated in FIG. 3, rearward guide line 21a, which is a type of guide line 21 with the same dimension and shape as those of guide line 21, is set at a location that is on the rear side of guide line 21 and corresponds to the position of guide line 21 when truck 100 moves back by a predetermined distance with the current steering angle. The upper limit of the predetermined distance is a distance corresponding to the upper limit distance of the detection of object detection unit 3. Next, the corner of guide line 21 and the corner of rearward guide line 21a are connected to each other with line 21b. The portion surrounded by guide line 21, rearward guide line 21a, and line 21b is region 23.

Figure 4B:
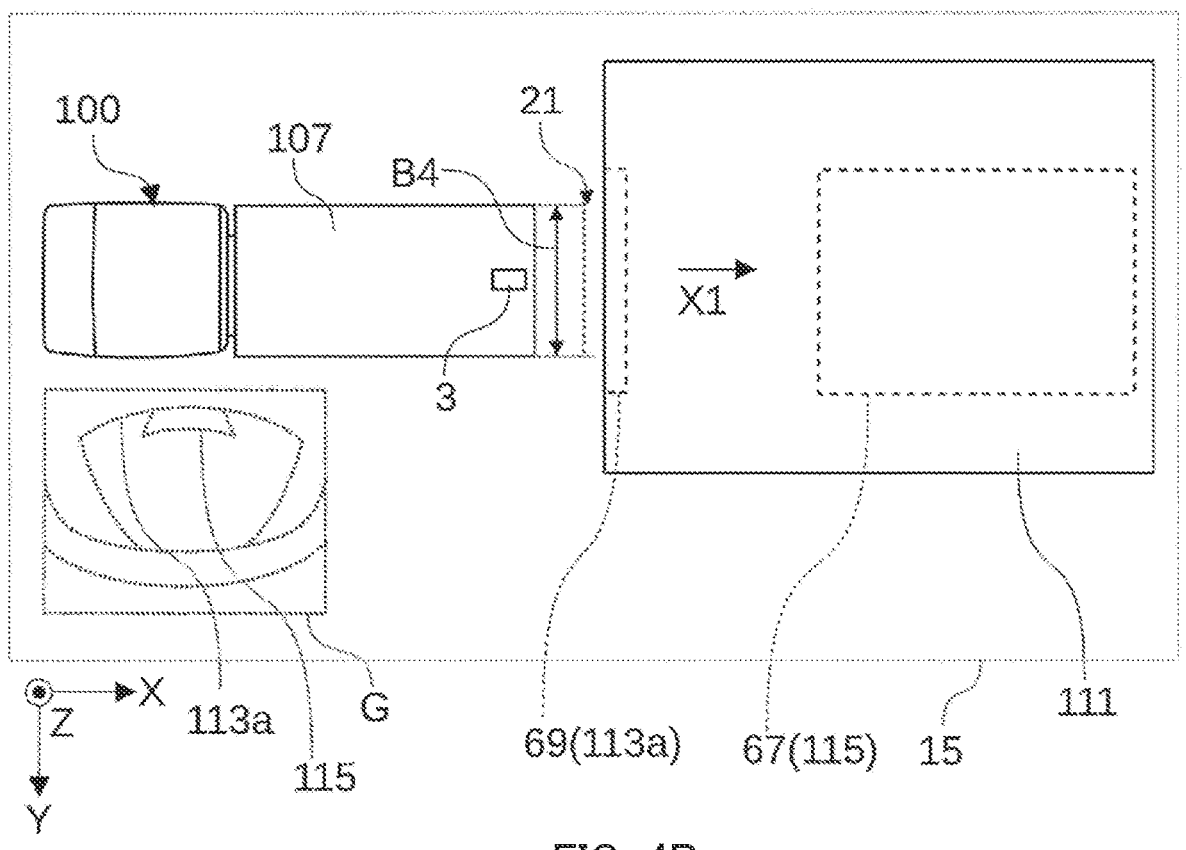

Note that guide line 21 need not have exactly the same size as the outer periphery of the rear end of cargo bed 107 in back view. For example, width B4 of guide line 21 illustrated in FIG. 4B is the same as the width of cargo bed 107, while height B1 of guide line 21 illustrated in FIG. 4A is higher than height B3 of cargo bed 107. This is to accommodate a case where the height of the rear end of cargo bed 107 is temporarily increased when truck 100 travels over a partially raised portion such as step 121 on road surface 109 illustrated in FIG. 4A. As such, an example of height B1 may be a height corresponding to the rear end of cargo bed 107 when travelling over the highest possible step 121. In addition, the position of guide line 21 need not necessarily completely match the position of the rear end of cargo bed 107. As illustrated in FIG. 4A, guide line 21 may be set at a position on the rear side by a predetermined distance B2 from the rear end of cargo bed 107. This is to accommodate the braking distance of a case where the driver applies the brakes to avoid collision with an object located in region 23 surrounded by guide line 21.

The position of rearward guide line 21a differs depending on the travelling direction of truck 100. In FIG. 3, truck 100 is moving back to the X1 direction parallel to the X direction, which is the front-rear direction, and therefore the position of rearward guide line 21a is on the rear side of guide line 21 in the X direction. On the other hand, for example, in the case where truck 100 is moving back while turning left or right, the position of rearward guide line 21a is a position shifted left or right from guide line 21. Line 21b is also a curved line, not a straight line when truck 100 is turning. The reason for this is that region 23 is a range representing the traveling path of truck 100. Note that whether truck 100 is turning can be acquired from steering angle sensor 11 illustrated in FIG. 2.

Next, collision possibility determination unit 9 determines that there is a possibility of collision when the velocity vector of the object specified by object specifying unit 7 is greater than the speed of truck 100 and the directions of the velocity vectors of object and truck 100 are opposite to each other. More specifically, it is determined that there is a possibility of collision when an object and truck 100 are approaching each other. The reason for this is that it is determined that there is no possibility of collision when they are moving away from each other. In this manner, collision possibility determination unit 9 determines that there is a possibility of collision when the detected object has a size equal to or greater than a predetermined size, falls within region 23, and approaches each other. Thus, the possibility of collision can be determined in accordance with the travelling state of truck 100. Note that the speed of truck 100 can be acquired from speed sensor 13 as illustrated in FIG. 2. The travelling direction of truck 100 may be determined from the steering angle and the rotating direction of the wheels of truck 100.

When it is determined that there is a possibility of collision of truck 100 with an object, collision possibility determination unit 9 makes the driver of truck 100 recognize the possibility of the collision. An example of a specific means for recognition may be a means that notifies the possibility of collision with sound in the case where speaker 17 illustrated in FIG. 2 is provided in cab 105. In addition, in the case where display unit 15 for displaying image G illustrated in FIG. 5 is provided in cab 105, emphatic display 31 emphasizing upper frame 113a of entrance 113 of warehouse 111, which is an object detected from image G, may be displayed in a superimposed manner on image G displayed in display unit 15 as illustrated in FIG. 5. In addition, emphatic display 33 emphasizing the second-floor floor 115 in warehouse 111, which is an object detected from image G, may be displayed in a superimposed manner on image G displayed in display unit 15. The reason for this is that when the driver sees emphatic displays 31 and 33 displayed on display unit 15, the driver can recognize a possibility of collision of the upper end of cargo bed 107 with upper frame 113a and second-floor floor 115.

Further, collision possibility determination unit 9 determines that there is a danger of collision when the distance between truck 100 and the object determined to have a possibility of collision with truck 100 becomes a predetermined distance or less, and makes the driver of truck 100 recognize the danger of collision. Unlike the possibility of the collision, the danger of collision is a case where there is a possibility of collision with the object unless the driver applies the brake. Therefore, the predetermined distance is a value obtained by multiplying the braking distance of the brake by a safe rate. It should be noted that here, the collision means the overlap of the object with the rectangular range surrounded by guide line 21, or more specifically, the range illustrated with hatching in FIG. 3. Therefore, in the case where height B1 is greater than height B3 of actual cargo bed 107 as with guide line 21 illustrated in FIG. 4A, the object and cargo bed 107 may not be actually collide with each other even when it is determined that there is a danger of collision. For example, upper frame 113a of entrance 11 and the installation height of second-floor floor 115 illustrated in FIG. 4A are higher than height B3 of actual cargo bed 107, and therefore it may not actually collide with truck 100 even when it is determined that the danger of collision.

The specific means for making the driver of truck 100 recognize the danger of collision is the same as the means for making the driver recognize the possibility of collision. In this manner, the danger of collision can be avoided by making the driver recognize the danger of collision when the distance from the object with the possibility of collision becomes close to the predetermined distance.

Such a configuration of making the driver of truck 100 recognize the possibility and danger of collision is especially effective in the case where a plan view around the truck 100 also called perspective view as illustrated in of FIG. 4B is displayed on the display unit illustrated in FIG. 2. Even when the driver sees the plan view illustrated in FIG. 4B, second-floor floor 115 and upper frame 113a of entrance 113 are not displayed although warehouse 111 is displayed. As such, the possibility of collision of truck 100 with upper frame 113a and second-floor floor 115 cannot be determined although it can be determined that there is warehouse 111 is located on the rear side of truck 100. In this manner, in the case where the plan view is displayed on the display unit 15 illustrated in FIG. 2, rearward monitoring system 1 can make the driver recognize the possibility of truck 100 with collision of upper frame 113a and second-floor floor 115 with an alarm issued from speaker 17 and the like. In this manner, the driver can take an action for avoiding the collision by visually recognizing upper frame 113a and second-floor floor 115 by changing the display image of display unit 15 from the plan view to an image that shows upper frame 113a and second-floor floor 115 such as the wide-angle image illustrated in FIG. 5, and the like.

Thus, in the case where the image displayed on display unit 15 does not show the rear side and upper side of truck 100, rearward monitoring system 1 may make the driver recognize a possibility and danger of collision when object detection unit 3 detects the object, object specifying unit 7 specifies the position, size and velocity vector the object, collision possibility determination unit 9 determines the possibility and danger of collision, and there is a possibility and danger of collision. The image displayed on display unit 15 does not show the rear side and upper side of truck 100 is a case where a plan view around the truck 100 is displayed on display unit 15, and a case where a captured image of the range around truck 100 not including the rear side and upper side of truck 100 is displayed on display unit 15. Whether the displayed image is a captured image of the range not including the rear side and upper side of truck 100 may be determined based on the field angle of the camera that has captured the image.

Note that in the case where object specifying unit 7 is a wide-angle camera, the configuration of generating the plan view may be a configuration in which camera images captured by a plurality of cameras such as object detection unit 3 are converted into a plan view by object specifying unit 7 or other computers through a publicly known image processing technique.

In the case where the image displayed on display unit 15 does not show the rear side and upper side of truck 100, and it is determined that there is a possibility of collision of truck 100 with the detected object, rearward monitoring system 1 can make the driver of truck 100 recognize the possibility of the collision through the following three means, for example.

A first example may be a means for making the driver of truck 100 recognize the possibility of the collision in which, in the case where the image displayed on display unit does not show the rear side and upper side of truck 100 and collision possibility determination unit 9 determines that there is a possibility of collision of truck 100 with the object detected by object detection unit 3, collision possibility determination unit 9 switches the display of display unit 15 from the image that does not show the rear side and upper side of truck 100 to the camera image in which the detected object is captured. For example, it is assumed that in the case where display unit 15 shows a plan view of warehouse 111 illustrated in FIG. 4B, collision possibility determination unit 9 determines that there is a possibility of collision of truck 100 with second-floor floor 115 and upper frame 113*a* of warehouse 111. In this case, upper frame 113*a* and second-floor floor 115 are not displayed in display unit 15, collision possibility determination unit 9 switches the display of display unit 15 from the plan view illustrated in FIG. 4B to image G in which upper frame 113*a* and second-floor floor 115 are captured as illustrated in FIG. 5. This means is advantageous in that the display can be automatically switched to the image including the object determined to have a possibility of collision without the need of the switching of the display image of display unit 15 by the driver.

Another example may be a means in which in the case where display unit 15 is an apparatus of displaying a plan view around the truck 100 and collision possibility determination unit 9 determines that there is a possibility of collision of truck 100 with the object detected by object detection unit 3, collision possibility determination unit 9 draws on display unit 15 a projection line of the position of the detected object projected to the plan view to make the driver of truck 100 recognize the possibility of the collision. For example, as illustrated in FIG. 4B, in the case where display unit 15 shows a plan view of warehouse 111 and collision possibility determination unit 9 determines that there is a possibility of collision of truck 100 with second-floor floor 115 and upper frame 113*a* of warehouse 111, it suffices that collision possibility determination unit 9 draws on display unit 15 projection line 69 projecting upper frame 113*a* on the plan view and projection line 67 projecting second-floor floor 115 on the plan view in a superimposed manner on the plan view. This means is advantageous in that the driver can determine the plan position of the object with a possibility of collision with truck 100 while displaying the plan view.

Another example may be a means in which in the case where the image displayed on display unit 15 does not show the rear side and upper side of truck 100, and collision possibility determination unit 9 determines that there is a possibility of collision of truck 100 with the object detected by object detection unit 3, collision possibility determination unit 9 displays the camera image in which the object detected by object detection unit 3 is captured in a part of the region on display unit 15 in a superimposed manner on the image that does not show the rear side and upper side of truck 100 to make the driver of truck 100 recognize the possibility of the collision. For example, in the case where display unit 15 shows a plan view of warehouse 111 illustrated in FIG. 4B and collision possibility determination unit 9 determines that there is a possibility of collision of truck 100 with second-floor floor 115 and upper frame 113*a* of warehouse 111, collision possibility determination unit 9 displays image G showing upper frame 113*a* and second-floor floor 115 as illustrated in FIG. 5 in the lower left part, which is a part of the region of display unit 15 in a superimposed manner on the plan view already shown in display unit 15 as illustrated in FIG. 4B. This means is advantageous in that the position and the shape of an object with a possibility of collision with truck 100 can be three-dimensionally visually recognized while displaying the plan view. The specific structure of rearward monitoring system 1 according to the first embodiment is as described above.

Next, the rearward monitoring method using rearward monitoring system 1 according to the first embodiment is briefly described with reference to FIG. 6. First, object specifying unit 7 illustrated in FIG. 2 issues a command, to object detection unit 3, for detecting an object located behind and above the upper end of the rear end of cargo bed 107 of truck 100. Object detection unit 3 acquires the information required for specifying the object by capturing the rear side of the vehicle at a predetermined time interval on the basis of the command and the like, and transmits the information to object specifying unit 7 (at S1 in FIG. 6, the object detection step).

Figure 6:
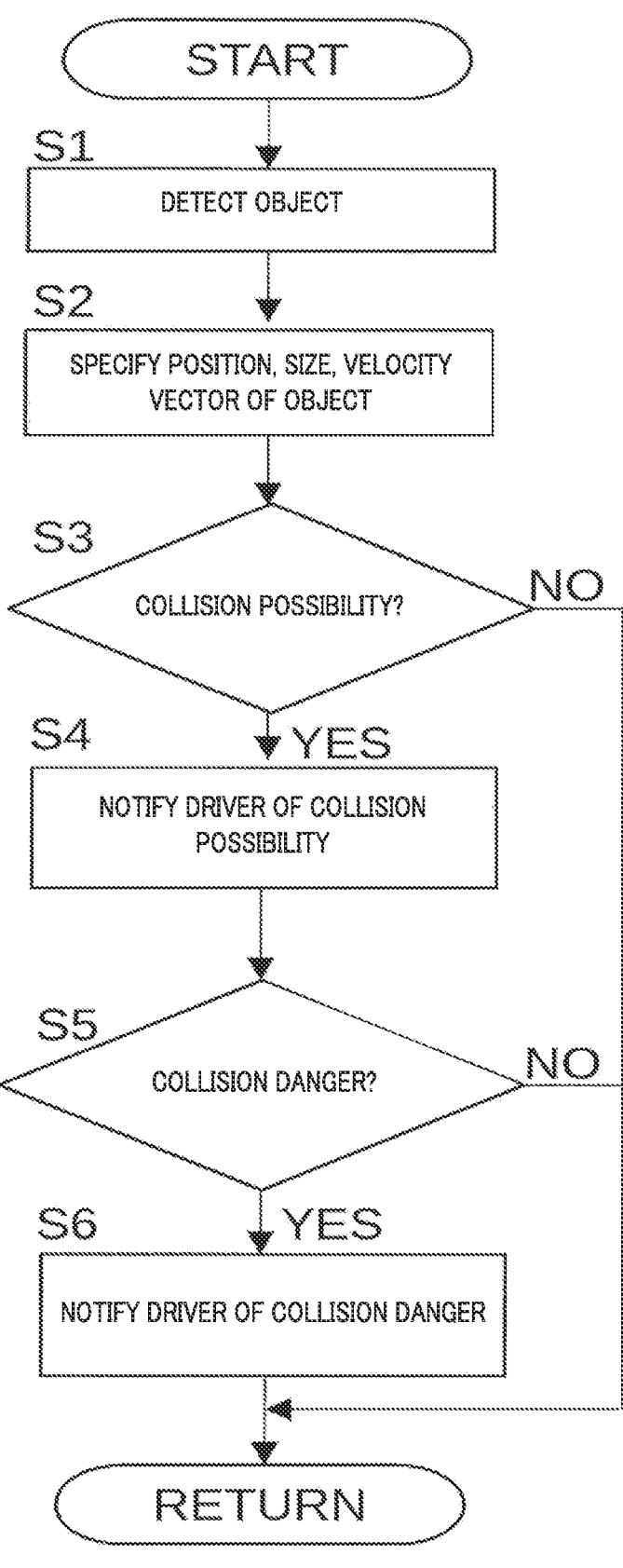
FIG. 6 is a flow chart illustrating a procedure of a rearward monitoring method using the rearward monitoring system according to the first embodiment.

Object specifying unit 7 illustrated in FIG. 2 specifies the position, size and velocity vector of the object from the information required for specifying the object, i.e., here, the image obtained by capturing the rear side of the vehicle through image analysis and the like (at S2 in FIG. 6, the object specifying step). Object specifying unit 7 transmits the specified position, size and velocity vector of the object to collision possibility determination unit 9.

Next, collision possibility determination unit 9 illustrated in FIG. 2 determines whether there is a possibility of collision with truck 100 from the received position, size and velocity vector of the object object. When it is determined that there is a possibility of collision, the process proceeds to S4, whereas when it is determined that there is no possibility of collision, the process returns (at S3 in FIG. 6).

When it is determined that there is a possibility of collision of truck 100 with the object at S3, collision possibility determination unit 9 illustrated in FIG. 2 makes the driver recognize the possibility of collision by using display unit 15 and speaker 17 installed in cab 105, and the process proceeds to S5 (at S4 in FIG. 6). Note that S3 and S4 are also referred to as collision possibility determination step.

Next, collision possibility determination unit 9 illustrated in FIG. 2 determines whether there is a danger of collision with truck 100 for the object that is determined at S3 to have a possibility of collision with truck 100. When it is determined that there is a danger of collision, the process proceeds to S6, whereas when it is determined that there is no danger of collision, the process returns (at S5 in FIG. 6). More specifically, collision possibility determination unit 9 illustrated in FIG. 2 determines that there is a danger of collision when the object determined to have a possibility of collision with truck 100 and the shortest distance of truck 100 becomes equal to or smaller than a predetermined distance on the basis of the position of the object specified at S2.

When it is determined at S5 that there is a danger of collision of truck 100 with the object, collision possibility determination unit 9 illustrated in FIG. 2 makes the driver recognize the danger of collision by using display unit 15 and speaker 17 installed in cab 105, and returns the process (at S6 in FIG. 6). Note that S5 and S6 are also referred to as the danger of collision determination step. The above is a brief description of the rearward monitoring method according to the first embodiment using rearward monitoring system 1.

As described above, according to the first embodiment, rearward monitoring system 1 includes object detection unit 3, object specifying unit 7, and collision possibility determination unit 9. In this configuration, the object behind and above the upper end of the rear end of truck 100 is detected by object detection unit 3, the detected position, size and velocity vector of the object is specified by object specifying unit 7, and the possibility of collision of truck 100 with the detected object is determined by collision possibility determination unit 9. Thus, the driver can determine the possibility of collision of the vehicle with the structure located behind and above the vehicle.

Next, a second embodiment is described with reference to FIGS. 7 to 9. In the second embodiment, as object detection unit 3, cameras are provided at two locations at different heights, the rear side and upper side of truck 100 are captured, and each captured image is converted into a bird's-eye view as viewed upward from road surface 109, and the object is specified from the difference of bird's-eye views 64. Note that in the second embodiment, the components with the same function as those of the second embodiment will be denoted with the same reference numerals, and differences from the first embodiment will be mainly described.

Figure 7:
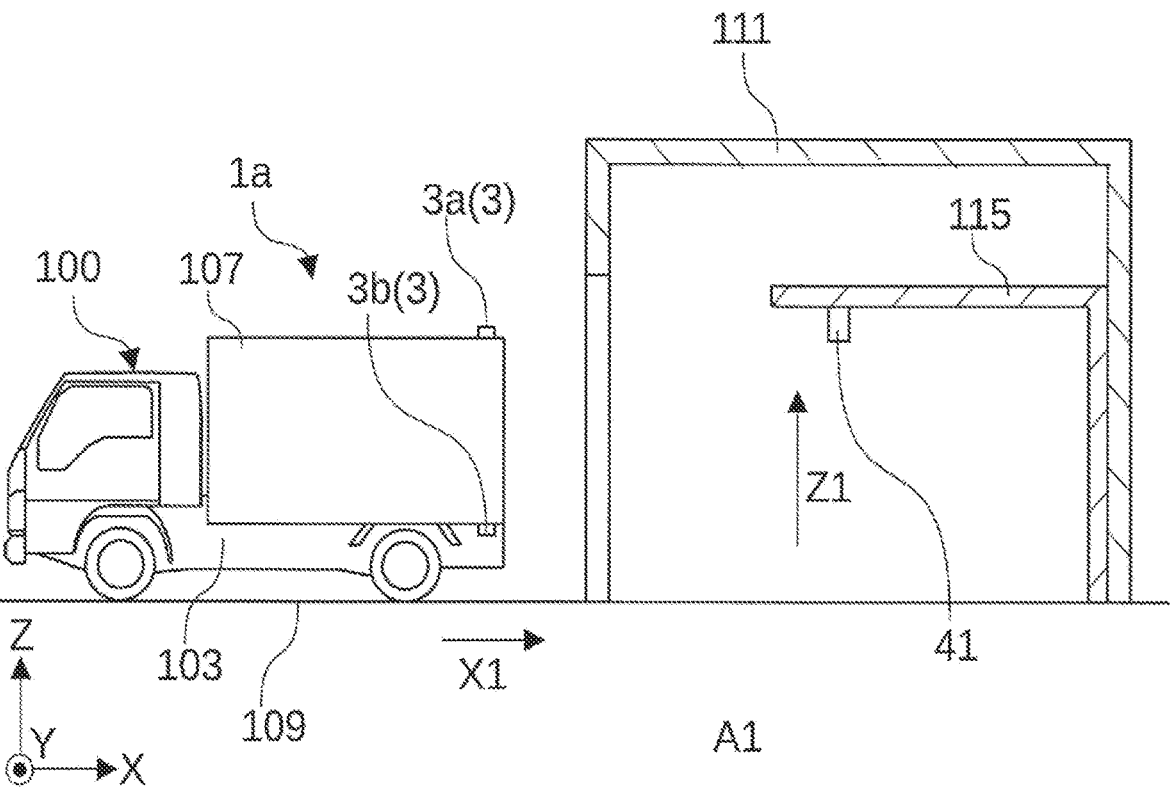
FIG. 7 is a side view for describing a procedure of detecting an object located behind and above a truck with a rearward monitoring system according to a second embodiment, in which a warehouse is illustrated in a sectional view.

As illustrated in FIG. 7, rearward monitoring system 1a according to the second embodiment includes upper camera 3a and lower camera 3b as object detection unit 3. Upper camera 3a is an image monocular camera that is installed at the upper end of the rear end of cargo bed 107 of truck 100, and repeatedly captures at a predetermined time interval the image of the rear side of truck 100 including the upper side of the horizontal direction at the installed position. Upper camera 3a has the same structure and installation position as the case where object detection unit 3 is a monocular camera in the first embodiment.

Lower camera 3b is a monocular camera that repeatedly captures at a predetermined time interval the image of behind and above the upper end of the rear end of truck 100 including the upper side of the installed position of upper camera 3a. Lower camera 3b is installed at a position lower than upper camera 3a at the rear end of truck 100, and in this case installed at the rear end of chassis 103. The installation position of lower camera 3b in the vehicle width direction is the same as that of upper camera 3a. The structure of lower camera 3b is the same as the structure of upper camera 3a, and is set with a field angle and optical axis that can capture the image of behind and above the upper end of the rear end of truck 100 including the upper side of the installed position of upper camera 3a. In this configuration, rearward monitoring system 1a captures the rear and upper sides of the upper end of the rear end of truck 100 at a predetermined time interval with two cameras, upper camera 3a and lower camera 3b. The procedure of specifying the position, size and velocity vector of the object located behind and above the upper end of the rear end of truck 100 in this configuration is as follows.

Figures 8A, 8B:
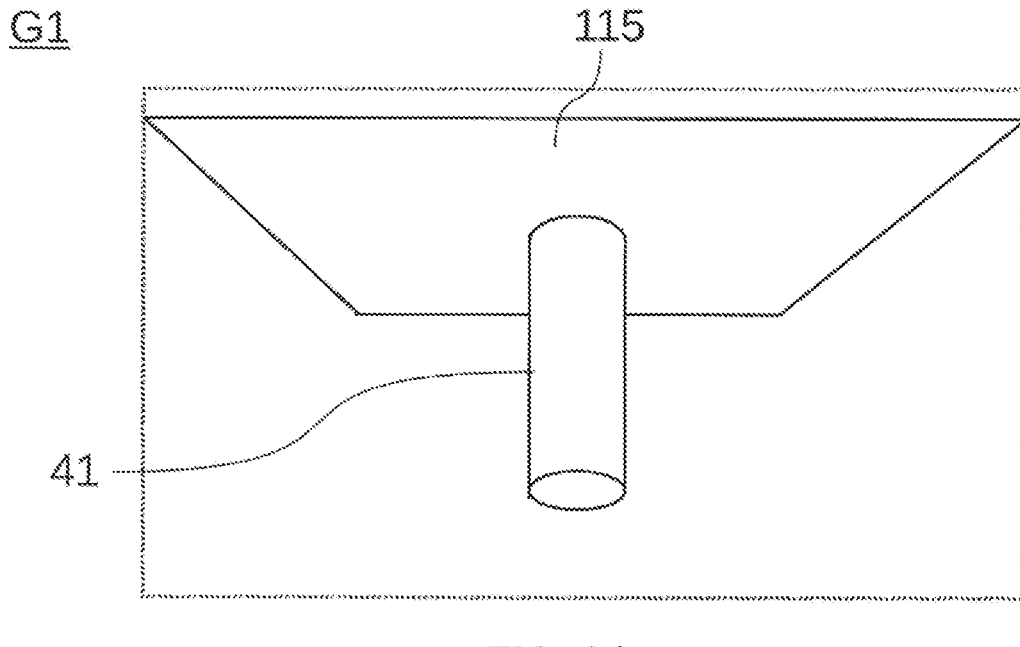
FIGS. 8A and 8B are schematic views of an image in which a pole is captured with an object detection unit in the rearward monitoring system according to the second embodiment.

For example, as illustrated in FIG. 7, it is assumed that pole 41 is provided to protrude downward from the bottom surface of second-floor floor 115 of warehouse 111. It is assumed that pole 41 is located behind and above the upper end of the rear end of truck 100. To specify the position, size, and velocity vector of this pole 41, first, the image including the rear and upper sides of the upper end of the rear end of truck 100 is captured as in the first embodiment with the two cameras, upper camera 3a and lower camera 3b. FIG. 8A schematically illustrates upper camera image G1, which is an image captured with upper camera 3a. FIG. 8B schematically illustrates lower camera image G2, which is an image captured with lower camera 3b.

As illustrated in FIGS. 8A and 8B, upper camera image G1 and lower camera image G2 show at least pole 41. It should be noted that the rear portion of pole 41 is not shown by being hidden by pole 41. In addition, the size of the portion hidden on the rear side is larger in upper camera image G1 than in lower camera image G2, because upper camera image G1 is an image captured at a position closer to pole 41 than lower camera image G2.

Figures 9A, 9B:
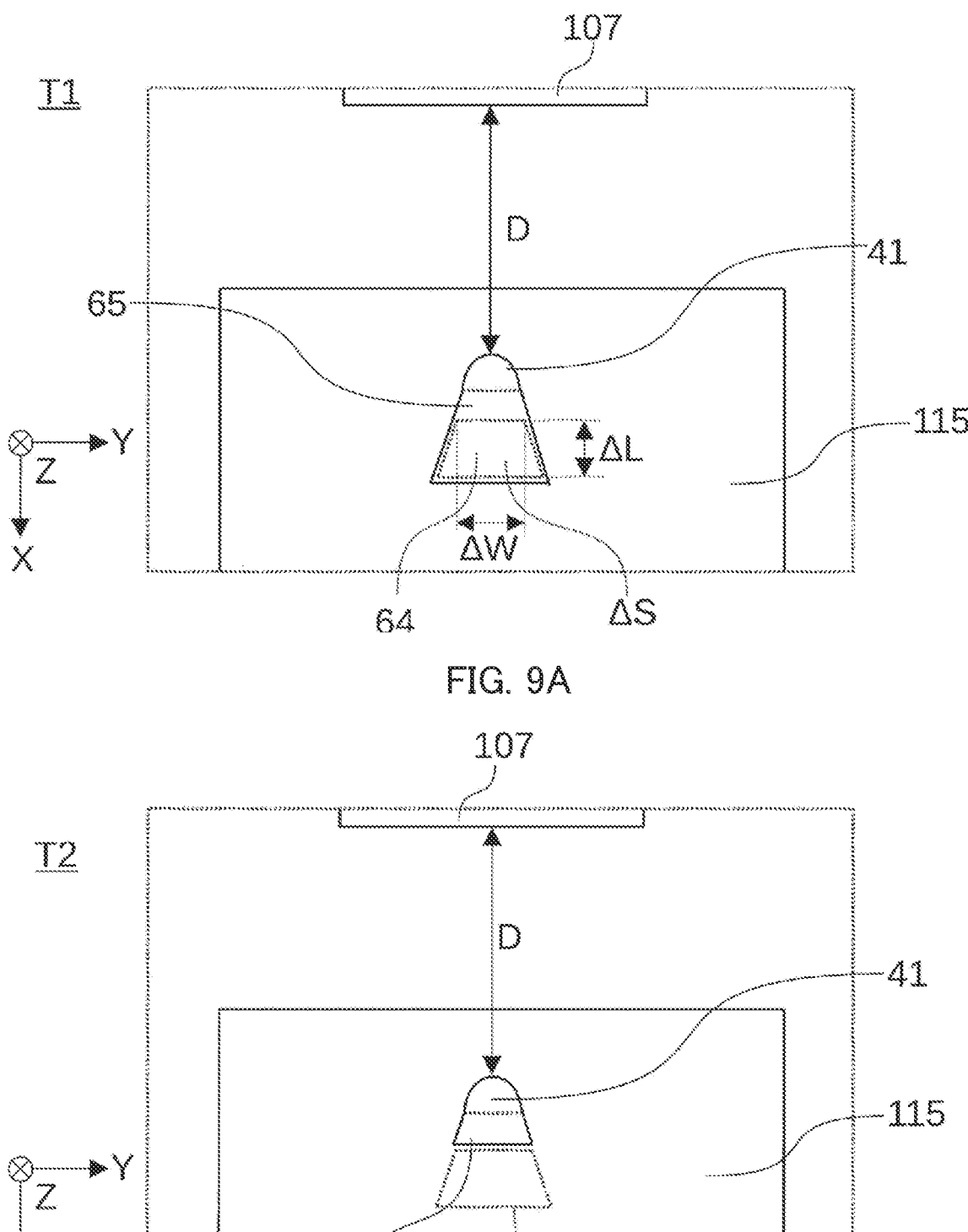
FIG. 9A is a schematic view of an image converted to an upward image as viewed from the ground from the upper camera image illustrated in FIG. 8A.
FIG. 9B is a schematic view of an image converted to an upward image as viewed from the ground from the upper camera image illustrated in FIG. 8B.

Next, object specifying unit 7 converts upper camera image G1 and lower camera image G2, which are images captured with upper camera 3a and lower camera 3b, into upper bird's-eye view T1 and lower bird's-eye view T2, which are upward images as viewed from road surface 109. It suffices that the virtual view points of upper bird's-eye view T1 and lower bird's-eye view T2 are set to the center of the projected range of the case where the capturing ranges of upper camera image G1 and lower camera image G2 are projected on road surface 109. FIG. 9A schematically illustrates upper bird's-eye view T1 converted from upper camera image G1. FIG. 9B schematically illustrates lower bird's-eye view T2, which is an image captured with lower camera 3b.

As illustrated in FIGS. 9A and 9B, an object with a height such as pole 41 is largely differ in the shapes shown in upper bird's-eye view T1 and lower bird's-eye view T2 and the actual shape. In addition, by comparison between upper bird's-eye view T1 and lower bird's-eye view T2, the displayed shapes and sizes are largely different from each other. More specifically, the rear side of the portion that is unshown by being hidden by pole 41 in upper camera image G1 and lower camera image G2 is image-corrected into the same one as pole 41. Pole 41 is located at approximately the center in the vehicle width direction of truck 100, and the rear side of the portion that is unshown by being hidden by pole 41 in upper camera image G1 and lower camera image G2 is image-corrected into trapezoidal corrected part 65.

In addition, upper bird's-eye view T1 has a larger corrected part 65 than in lower bird's-eye view T2. The reason for this is that in upper camera image G1, the portion hidden in rear of pole 41 is larger than in lower camera image G2. The position and size of difference 64 of corrected part 65 are correlated with the position and size of pole 41. More specifically, the position of difference 64 is on the rear side of the position of pole 41, the position of pole 41 can be specified from the position of difference 64. When the position can be specified, the distance D between pole 41 and the rear end of cargo bed 107 can be determined. In addition, since difference 64 increases as the size of pole 41 increases, the vertical height of pole 41 can be specified from length $\Delta L$ of difference 64 in the front-rear direction of truck 100. Further, the width of pole 41 can be specified from the width of difference 64 in the vehicle width direction of truck 100, which is shortest width $\mu W$ in FIG. 9A. In addition, since area $\Delta S$ of difference 64 increases as the length of pole 41 in the Z direction and the width in the Y direction thereof increase, the length and width of pole 41 can be estimated from area $\Delta S$ of difference 64. Therefore, the position and size of the object located behind and above the upper end of the rear end of truck 100 can be specified from the position and size of difference 64.

In addition, in the case where upper camera image G1 and lower camera image G2 captured at a predetermined interval are sequentially converted into upper bird's-eye view T1 and lower bird's-eye view T2, the velocity vector can be determined from the variation of the size and position of difference 64. More specifically, in the case where the size of difference 64 is gradually increased with time, the direction of the relative speed of the object with respect to truck 100 is the direction approaching truck 100. In addition, the larger the variation of the size of difference 64 per unit time, the larger the relative speed of the object with respect to truck 100.

Therefore, the velocity vector of the object located behind and above the upper end of the rear end of truck 100 can be specified from the variation of the position and size of difference 64. In this manner, there is correlations between the position, size, and variation thereof of difference 64, and the position, size, and velocity vector of pole 41. Therefore, the position, size, and velocity vector of pole 41 can be determined by determining the correlations through experiment and the like, and applying difference 64 to the determined correlations. Note that the configurations other than the means for specifying the object in the second embodiment, e.g., the criterion for determining a possibility and danger of collision, are the same as those of the first embodiment, and the description thereof is omitted.

The first embodiment and the second embodiment may be selected as necessary in consideration of the advantage. For example, the first embodiment is advantageous in that the number of the installation positions of object detection unit 3 is smaller than in the second embodiment because object detection unit 3 need only be installed at the upper end of the rear end of cargo bed 107. The second embodiment is advantageous in that the position and size of the object can be detected with high accuracy even with a monocular camera as object detection unit 3.

The above description of the present disclosure is based on the embodiments, but the present disclosure is not limited to the embodiments. It is natural for those skilled in the art to come up with various variations and improvements within the scope of the technical concept of the present disclosure, and these are naturally included in the present disclosure.

The invention claimed is:

1. A vehicle rearward monitoring system configured to monitor an object located behind and above a vehicle, the vehicle rearward monitoring system comprising:

a camera or a clearance sonar installed in the vehicle and configured to detect the object located behind and above an upper end of a rear end of the vehicle; and a computer configured to specify a position, a size and a velocity vector with respect to the vehicle of the object detected by the camera or the clearance sonar; and determine a possibility of collision of the vehicle with the object detected by the camera or the clearance sonar from the position, the size and the velocity vector of the object specified by the computer, and make a driver of the vehicle recognize the possibility of collision when it is determined that there is the possibility of collision, wherein when a plan view of a periphery of the vehicle, or an image in which a range not including a rear side and an upper side of the vehicle of the periphery of the vehicle is captured is displayed on a display unit provided in a cab of the vehicle, the camera or the clearance sonar detects the object, the computer specifies the position, the size and the velocity vector of the object, and it is determined that there is a possibility of collision by the computer through determination of a possibility of collision, the driver of the vehicle is made recognize the possibility of collision.

2. The vehicle rearward monitoring system according to claim 1, wherein the camera or the clearance sonar is an upper camera installed at the upper end of the rear end of the vehicle and configured to repeatedly capture at a predetermined time interval an image of a rear side of the vehicle including an upper side of an installed position; and wherein the computer specifies a position of the object from the image captured by the upper camera through edge extraction, specifies the size of the object from a range occupied by the object in the image, and calculates the velocity vector from a variation of the position of the object in a plurality of images captured at the predetermined time interval, and a variation of the range occupied by the object in the image.

3. The vehicle rearward monitoring system according to claim 1, wherein the camera or the clearance sonar is a clearance sonar installed at the upper end of the rear end of the vehicle, and configured to emit ultrasound to surroundings and detect returning ultrasound reflected by the object; and wherein the computer specifies the position, the size and the velocity vector of the object from a time from emission to detection and a returning direction of the returning ultrasound reflected by the object that is detected by the clearance sonar.

4. The vehicle rearward monitoring system according to claim 1, wherein the camera or the clearance sonar includes:

an upper camera installed at the upper end of the rear end of the vehicle, and configured to repeatedly capture at a predetermined time interval an image of a rear side of the vehicle including an upper side of a horizontal direction at an installed position, and a lower camera installed at a position lower than the upper camera at the rear end of the vehicle, and configured to repeatedly capture at a predetermined time interval an image of the rear side of the vehicle including the upper side of the installed position of the upper camera, and wherein the computer converts images captured at the predetermined time interval by the upper camera and the lower camera into bird's-eye views that are upward images as viewed upward from a road surface, and, in the bird's-eye view of the image captured by the upper camera and the bird's-eye view of the image captured by the lower camera, the computer specifies the position, the size and the velocity vector of the object from a difference of an unshown portion that is hidden by the object in the images captured by the upper camera and the lower camera.

5. The vehicle rearward monitoring system according to claim 1, wherein the computer determines that there is a possibility of collision and makes the driver of the vehicle recognize the possibility of collision in a case where:

the size of the object specified by the computer is equal to or greater than a predetermined size, the object specified by the computer falls within a region that is surrounded by a guide line representing an outer periphery of the rear end of the vehicle when the guide line is extended rearward of the vehicle, the velocity vector of the object specified by the computer is equal to or greater than a speed of the vehicle, and directions of the object and the vehicle velocity vector are opposite to each other.

6. The vehicle rearward monitoring system according to claim 1, wherein when a distance between the vehicle and the object determined to have a possibility of collision with the vehicle becomes equal to or smaller than a predetermined distance, the computer determines that there is a danger of collision and makes the driver of the vehicle recognize the danger of collision.

7. The vehicle rearward monitoring system according to claim 1, wherein when it is determined that there is a possibility of collision of the vehicle with the object detected by the camera or the clearance sonar, the computer makes the driver of the vehicle recognize the possibility of collision by switching a display of the display unit to a camera image in which the object detected is captured, from the plan view, or the image in which the range not including the rear side and the upper side of the vehicle of the periphery of the vehicle is captured.

8. The vehicle rearward monitoring system according to claim 1, wherein the display unit is an apparatus configured to display the plan view of the periphery of the vehicle; and wherein when it is determined that there is a possibility of collision of the vehicle with the object detected by the camera or the clearance sonar, the computer makes the driver of the vehicle recognize the possibility of collision by drawing a projection line on the display unit in a superimposed manner on the plan view, the projection line being obtained by projecting onto the plan view the position of the object detected.

9. The rearward monitoring system according to claim 1, wherein when it is determined that there is a possibility of collision of the vehicle with the object detected by the camera or the clearance sonar, the computer makes the driver of the vehicle recognize the possibility of collision by displaying a camera image in which the object detected is captured in a part of a region of the display unit in a superimposed manner on the plan view, or the image in which the range not including the rear side and the upper side of the vehicle of the periphery of the vehicle is captured.

10. A vehicle rearward monitoring method configured to monitor an object located behind and above a vehicle, the vehicle rearward monitoring method comprising:

detecting the object located behind and above an upper end of a rear end of the vehicle;

specifying a position, a size and a velocity vector with respect to the vehicle of the object detected by the detecting; and determining a possibility of collision of the vehicle with the object detected by the detecting from the position, the size and the velocity vector of the object specified by the specifying, and making a driver of the vehicle recognize the possibility of collision when it is determined that there is the possibility of collision, wherein the detection, specification, and determination are performed when a plan view of a periphery of the vehicle, or an image in which a range not including a rear side and an upper side of the vehicle of the periphery of the vehicle is captured is displayed on a display unit provided in a cab of the vehicle.

\* \* \* \* \*